(No Model.)
J. H. ELLIOTT.
CAR TRUCK.
No. 441,650. Patented Dec. 2, 1890.
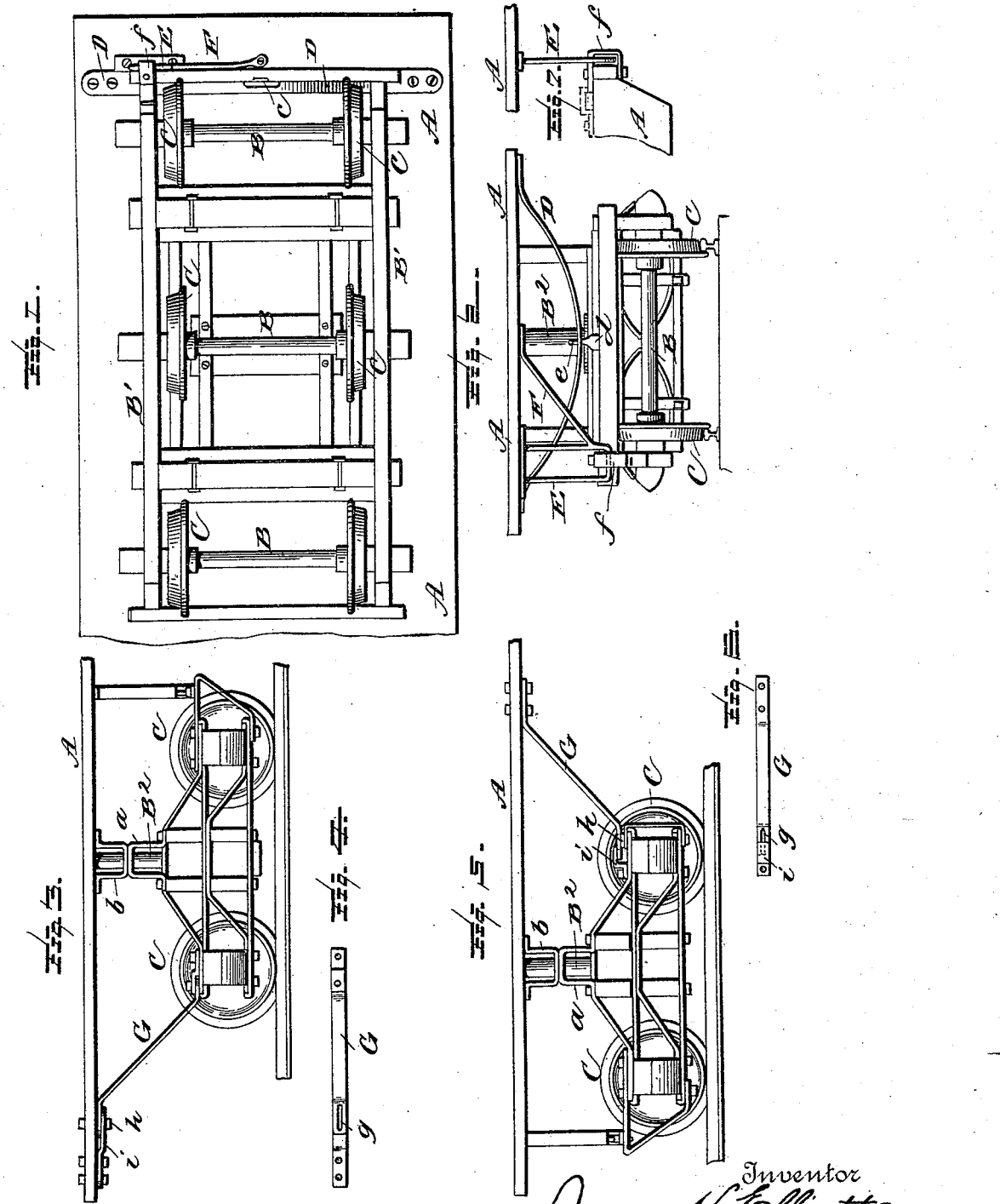
Witnesses
L. C. Hills
E. H. Bond
Inventor
James H. Elliott,
E. B. Stocking
Attorney

UNITED STATES PATENT OFFICE.

JAMES H. ELLIOTT, OF MONTREAL, CANADA.

CAR-TRUCK.

SPECIFICATION forming part of Letters Patent No. 441,650, dated December 2, 1890.

Application filed September 15, 1890. Serial No. 365,071. (No model.)

*To all whom it may concern:*

Be it known that I, JAMES H. ELLIOTT, a subject of the Queen of Great Britain, residing at Montreal, Province of Quebec, in the Dominion of Canada, have invented certain new and useful Improvements in Car-Trucks, of which the following is a specification, reference being had therein to the accompanying drawings.

This invention has relation to certain new and useful improvements in trucks for passenger or freight cars, engines, or tenders; and it has for its object, among others, to provide an improved truck wherein provision is made for preventing derailing of the cars or tender, and also to prevent any of the said trucks from falling or dropping into a culvert or other open spaces or excavations in the track between the rails while the cars or train is in motion and off the rails, and for the purpose of preventing accidents and loss of life, as well as damage to the rolling-stock while in motion.

The present invention is designed more particularly as an improvement upon the construction shown in my patent, No. 424,282, dated March 25, 1890.

The novelty in the present instance resides in the peculiar combination and the novel construction, arrangement, and adaptation of parts, all as more fully hereinafter described, shown in the drawings, and more particularly pointed out in the appended claims.

The invention is clearly illustrated in the accompanying drawings, which, with the letters of reference marked thereon, form a part of this specification, and in which—

Figure 1 is a bottom plan illustrating a portion of a truck provided with my improvements. Fig. 2 is an end elevation of the same. Fig. 3 is a side elevation. Fig. 4 is a plan of the brace-arm shown in Fig. 3 removed. Fig. 5 is a side elevation showing a reversal of the parts. Fig. 6 is a plan of the brace of Fig. 5 removed. Fig. 7 is a detail in side elevation.

Like letters of reference refer to like parts throughout the several views.

Referring now to the details of the drawings by letter, A designates the platform of any suitable construction. The axles B have bearings in the frame B', which may be of any approved form of construction, and which are pivotally connected with the platform by means of the king-bolts $B^2$ in the usual manner, so that the trucks or frames B' may turn on said king-bolts as pivots. C are the wheels on the axles, said wheels being of any well-known or preferred construction. The truck-frames are suitably braced, as shown in the different views, so as to combine the greatest strength with the least material and weight.

In Fig. 1 I have shown my invention as applied to a six-wheeled truck for passenger-coaches, and in the other figures as applied to a four-wheeled truck for freight-cars; but all the features of novelty herein described are applicable to either form of truck, and the several features are capable of use either singly or collectively.

In Figs. 3 and 5 I have shown the upper brace-timbers of the truck as formed centrally with an inverted-U-shaped piece $a$, and directly above the same is a substantially U-shaped piece $b$, secured to the under side of the platform, the two being arranged in vertical lines and adapted to have a bearing one upon the other, as seen in Figs. 3 and 5. They serve to limit the rocking movement of the truck, and also as guides upon which the truck may turn.

Referring now to Fig. 2, D is a substantially U-shaped or semi-elliptic bar bolted securely at each end to the platform of the car and provided through its center with an elongated slot $c$, as seen best in Fig. 1, and through which slot passes upwardly an arm or rod $d$, provided at its upper end with a cap-head or cross-bar $e$ to prevent the withdrawal therefrom. This rod $d$ is rigidly secured to the end of the truck-frame, and the cross-bar or head, which extends at right angles to the slot, serves to hold the truck up and prevent its dropping down from the car into a culvert or hole between the tracks. There may be one of the last-mentioned attachments at each end of the six-wheeled truck, if desired. If preferred, the parts D and $d$ may be reversed, the pin $d$ being secured to the under side of the platform and the part D upon the truck-frame, in which latter case it need not be bent, but may extend substantially horizontal.

In Fig. 2 I have shown a substantially U-shaped piece E, secured in any suitable manner to the under side of the car and provided with an additional arm F, extending therefrom (either integral therewith or otherwise) in an inclined direction and secured at its ends to the under side of the platform substantially midway of its width. This piece E is designed to play loosely in the strap *f*, secured to the end of the truck-frame, as seen more clearly in Fig. 7, and allows for all necessary curvatures. This serves also to hold the truck up and keep it from falling away from the car, as will be readily understood from Fig. 7.

Referring now to Fig. 5, G is a long guide-arm fastened securely at one end to the under side of the platform, and near its other end provided with a longitudinal slot *g*, which is designed to play or work on the truck-frame, the flanged guide-piece *i* being provided and arranged to extend over the end of the arm *g* and prevent displacement thereof. The length of the slot is sufficient to allow for any curvature required. In lieu of the pin *h* a staple may be employed, as shown by dotted lines in Fig. 7. In Fig. 3 substantially the same arrangement is shown with the parts reversed—that is, the arm G is secured at its lower end to the truck-frame, and at its upper end is provided with the slot *g*, engaging a guide-pin *h* on the platform, the plate *i* also being employed and embracing the pin to give strength thereto, as seen in said Fig. 3. This allows sufficient movement of the parts around the sharpest curves employed in railway constructions.

As hereinbefore mentioned, the features above described may be used together or separately, as occasion may require, and they may be applied to and used with all and every kind of freight, engine, tender, and passenger trucks.

What I claim as new is—

1. The combination, with the platform and pivoted truck, of the guide-arm connecting the platform and truck and having limited play at one end and the brace-plate overlapping the movable end of the brace-arm, substantially as and for the purpose specified.

2. The combination, with the platform and pivoted truck, of the U-shaped piece upon the platform, formed with integral inclined arm, and the saddle secured to the truck and embracing the cross-bar of the U-shaped piece, substantially as and for the purpose specified.

3. The combination, with the pivoted truck and platform, of the U-shaped piece on the platform and engaging a stop on the truck, and provided with an inclined arm secured to the under side of the truck, substantially as described.

4. The combination, with the platform and pivoted truck, of the bar D, secured to the under side of the platform and elongated slot, the pin on the truck engaging the slot and having enlarged head, and the U-shaped piece at one corner of the platform, engaging a saddle on the truck and having an inclined brace-arm secured to the under side of the platform, substantially as and for the purpose specified.

In testimony whereof I affix my signature in presence of two witnesses.

JAMES H. ELLIOTT.

Witnesses:
  FRANCIS MILL,
  JOHN H. TRUEFORD.